Figure 1:
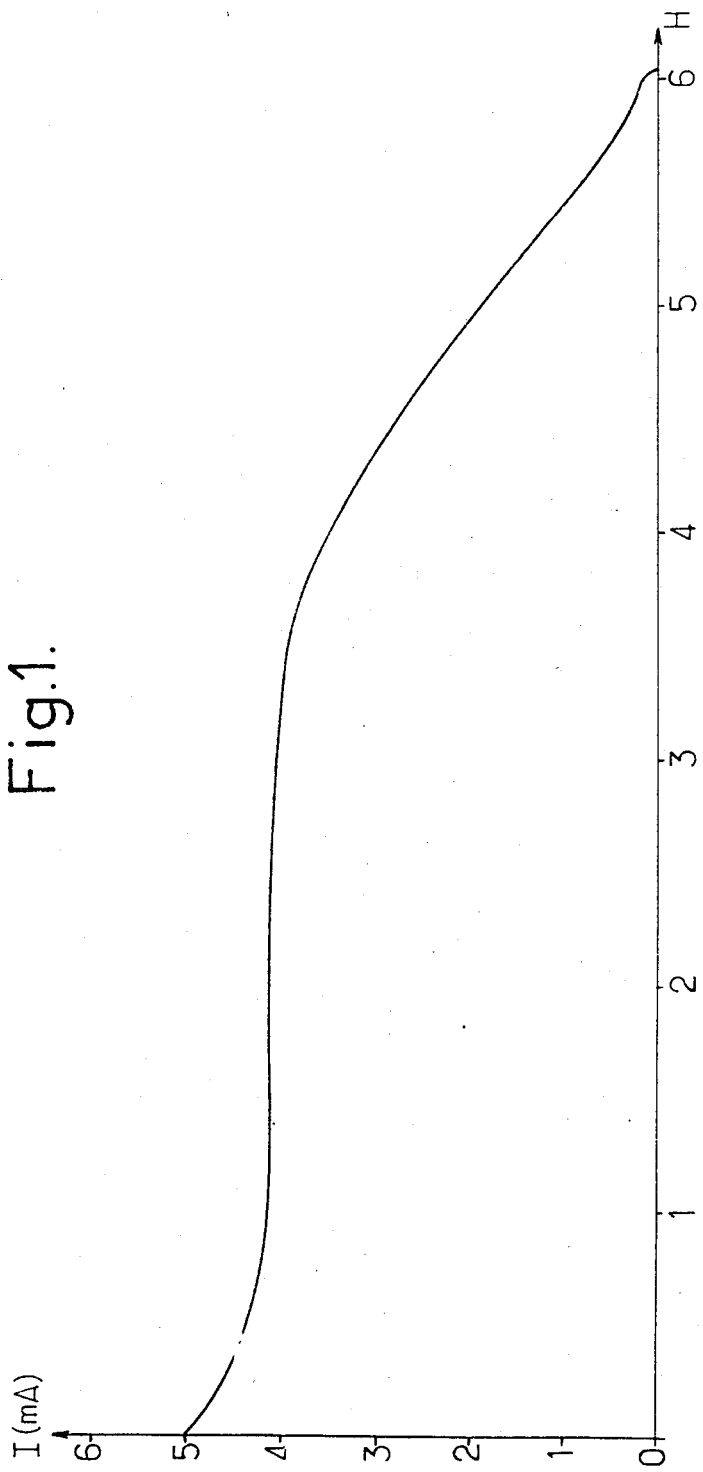

United States Patent [19]

Percheron nee Guegan et al.

[11] Patent Number: 4,609,599

[45] Date of Patent: Sep. 2, 1986

[54] NEW LANTHANUM AND NICKEL BASED ALLOYS, THEIR MANUFACTURE AND THEIR ELECTROCHEMICAL APPLICATIONS

[75] Inventors: Annick Percheron nee Guegan, Paris; Jean-Claude Achard, Kremlin-Bicetre; Guy Bronoel, Versailles; Joël Sarradin, Trappes, all of France

[73] Assignee: Agence Nationale de Valorisation de la Recherche (ANVAR), France

[21] Appl. No.: 264,523

[22] Filed: May 18, 1981

Related U.S. Application Data

[63] Continuation of Ser. No. 930,219, Aug. 2, 1978, abandoned.

[30] Foreign Application Priority Data

Aug. 2, 1977 [FR] France ............................ 77 23812

[51] Int. Cl.$^4$ ............................................ H01M 10/24
[52] U.S. Cl. .................................... 429/218; 148/3; 420/443; 420/455; 420/900; 423/644; 429/223; 429/224
[58] Field of Search .................... 75/170, 171; 148/3; 423/644; 429/218, 223, 224, 27, 40

[56] References Cited

U.S. PATENT DOCUMENTS 4,107,405  8/1978  Guegen et al. ...................... 75/170
4,154,364  5/1979  Hagiwara et al. .................... 75/171

Primary Examiner—R. Dean
Attorney, Agent, or Firm—Larson and Taylor

[57] ABSTRACT

The invention relates to lanthanum and nickel based alloys comprising components of the La Ni$_5$ type where the lanthanum and/or nickel are partially substituted, the substituent element comprising a metal M chosen in the VI or VII group of the elements periodic system and this according to an atomic proportion comprised between 0.1 and 2 relative to nickel, and preferably between 0.5 and 1.

The invention relates also to hydrogen electrodes made from such an alloy, and to an alkaline electrode type accumulator comprising such an electrode.

21 Claims, 4 Drawing Figures

NEW LANTHANUM AND NICKEL BASED ALLOYS, THEIR MANUFACTURE AND THEIR ELECTROCHEMICAL APPLICATIONS

This is a continuation of the application Ser. No. 930,219 filed Aug. 2, 1978, abandoned.

The invention relates to lanthanum and nickel based alloys, their manufacture and their electrochemical applications, particularly their application to the formation of hydrogen electrodes for electrochemical accumulators, particularly for accumulators of the alkaline electrolyte type.

It is known that the intermetallic components of lanthanum and nickel of La Ni$_5$ formula, or of neighbouring stoichiometry but presenting the structure of La Ni$_5$ have, at room temperature, retention properties towards hydrogen contained in gazeous phases.

But such properties which as a matter of fact are not integrally maintained in electrochemistry, more specially in applications where the hydrogen retention is carried out in contact with a liqud medium, are considerably affected when the temperature increases.

One observes in fact a fast load loss when the temperature is superior to the room temperature, thereby strongly limiting the possible uses of said alloys as hydrogen electrode materials.

By partial substitution of the constituent elements of said alloys of the La Ni$_5$ type, it has been possible to obtain materials presenting at high temperature a better behaviour than La Ni$_5$, particularly a capacity in relation to weight acceptable for industrial applications.

The applicants have now found out that said results may still be improved by having recourse to appropriate substitutions of the components of the La Ni$_5$ type.

The work carried out shows in fact that by using particular substituent elements, it is possible to increase the value of the lattice of the components of the La Ni$_5$ type while respecting said lattice, in order to form alloys with a high hydrogen retention and restitution power which, moreover, produces hydrides of greater stability, and this within a large temperature range.

The object of the invention is therefore new alloys which comply better than heretofore with the various requirements of practice, notably in an electrochemical medium and particularly in an alkaline medium.

In the alloys of the invention, the substituting element comprises a metal M of the VI or VII group of the elements periodic system, according to an atomic proportion of about 0.1 to 2, and preferably 0.5 to 1 based on the nickel.

According to an embodiment of the invention, the alloys hereabove mentioned comprise ternary compounds of formula I

$$LaNi_{x-y}M_y \qquad (I)$$

wherein M is a metal of the VI or VII group of the elements periodic system, x is a number from 4.7 to 5.5 and y is a number from about 0.1 and 2, and preferably between 0.5 and 1.

In a group of ternary alloys of formula (I) M is manganese.

Such ternary alloys remarkably exhibit, a high hydrogen storage and retention capacity, particularly in an electrochemical medium, and are capable of restituting the absorbed hydrogen practically in totality, thereby providing, in consequence, a highly satisfactory reversible operation.

The interest of said alloys is further increased due to their excellent behaviour as regards variations of temperature. As a matter of fact, their electrical properties, and in particular their electrochemical capacity are little affected by an increase of temperature.

Said alloys appear to be particularly useful as materials for storing hydrogen, particularly as hydrogen electrode materials, and this advantageously in their applications where temperature is likely to vary or remains constantly over room temperature.

According to another embodiment of the invention, the aforementioned alloys contain, further to the substituting element M, at least another element M′ substituting lanthanum and/or nickel and capable in particular to increase the formation energy of hydrides while not affecting appreciably the hydrogen retention power of the alloy, with the proviso that M does not represent chromium when M′ is a substitution element for nickel representing titanium.

The preferred alloys of said type are according to formula II

$$La_a Ni_{x-y-b} M_y M'_b \qquad (II)$$

wherein M, x and y have the hereabove mentioned meanings and M′ is chosen in the Ia, II, III, IV and V groups of the periodic system, a is a number from 0.8 to 1 and b is a number from 0.1 to 1.

A group a quaternary alloys of the invention comprises alloys wherein the substitution by M′ relates substantially to the lanthanum. M′ is then advantageously chosen in the IIb, IIIa and IVa groups.

A further group comprises alloys wherein the element M′ substitutes essentially nickel.

M′ is then chosen in the Ia, IIIb and Va groups.

The quaternary alloys of said group wherein M′ represents aluminium are particularly preferred in view of their electrochemical applications due to the advantageous effect provided by the aluminium on the increase of formation energy for the corresponding hydrides.

Generally, said alloys exibit important specific electrochemical capacities at room temperature and remain remarkably high, even at temperatures reaching 50°–60° C., and this particularly in the case of quaternary alloys.

The properties of the new alloys of the invention, particularly their hydrogen retention at high temperatures, are still improved when said alloys comprise, on at least a portion of the surface, compounds which, while authorizing the passage of hydrogen during cathodic charge, are capable of reducing the desorption of the adsorbed hydrogen.

Appropriate compounds in this respect comprise metals having a high supertension relatively to hydrogen.

Amongst said compounds, one can mention copper and particularly cadmium.

The alloys of the invention may be prepared after mixing by co-melting of the constituents elements.

Preferably, one mixes the alloy constituents, in melted state, particularly at a temperature between 1350° and 1550° C., the mixture being then cooled down for solidification, eventually down to room temperature, and is then subjected to a reheating operation at a temperature advantageously comprised between 600° and 1300° C.

The first melting and mixing step is carried out in a cooled down crucible, so as to avoid contamination of the alloy during manufacture by the constituents of the crucible itself.

In order to obtain a clean powder to include in the constitution of a hydrogen electrode, the obtained reheated alloy may be crushed and then reduced into a fine powder through various successive hydrogenation and dehydrogenation cycles, the hydrogenation being effected by contact with pressurized hydrogen in gazeous phase.

The whole of the properties of the hereabove mentioned alloys make them particularly adapted for the manufacture of hydrogen electrode materials intended for uses in electrochemical accumulators.

The object of the invention is therefore amongst others hydrogen electrodes based on the alloys such as defined hereabove.

The alloy used in said electrodes is advantageously in the form of a powder the grains of which having a diameter inferior to 100 microns, and preferably of the order of 10 microns. Said powder may be shaped by any conventional technique.

In order to provide a satisfactory rigidity and a good electrical contact, one incorporates in the material of the invention a metallic element, and eventually small quantities of plastics materials as binding agent.

As example, one mixes the alloy with a hydrophobic binding agent such as polytetrafluoroethylene or still with a hydrophilic binding agent such as those currently used for shaping zinc electrodes and formed for instance by polyvinylic alcohol cross-linked with dimethylthiourea. Said binding agents are advantageously used in the proportion of 10% by weight based on the mixture.

The paste thus obtained is used for coating a nickel sieve or sheet.

Preferably, the alloy is mixed with a binder or the electrolyte itself so as to form a paste which is introduced in nickel sheets of alveolate structure which may be thereafter subjected to a slight compression.

In such shapings for the making of electrodes, the alloys are used so as to apply about 300 mg/cm2.

The electrodes of the invention are advantageously used in energy accumulators, more particularly of the alkaline electrolyte type.

It should be remarked that their use in an alkaline medium is made possible due to the remarkable resistance to corrosion of the alloys of the invention which prove in particular little sensitive to the corrosive action of alkaline electrolytes.

Electrochemical chains are then formed which comprise at least one electrode comprising a material of the invention and an alkaline electrolyte.

Electrolytes made with an aqueous solution of potash are particularly suitable for the making of such chains. One may use the 5-6N potash and, advantageously, highly alkaline solutions formed with 12N potash, whereby it is possible to still improve the specific capacity of the alloys used in the electrodes of the invention.

According to a preferred embodiment of the accumulators of the invention, one forms an electrochemical chain having a hydrogen electrode comprising at least one material of the invention, an air electrode capable of supporting an anodic charge while preserving interesting characteristics when operating as a cathode, and comprising as regards the active material divided carbon, and an alkline electrolyte made of an aqueous solution of 5 to 12 times normal potash. In order to favour the retention of hydrogen by the alloy, it is advantageous to add to the electrolyte ions such as the antimony ion, the effect of which is to inhibit the decomposition of the formed hydrides.

The abovementioned air electrodes will be advantageously formed by electrodes of the type of those according to French Pat. No. 73.22182.

The elements of an accumulator such as hereabove defined can operate at atmospheric pressure up to temperatures of 50° C. about. It is also possible to operate at a pressure slightly superior of the order in particular of 1.5 bar when the temperature is in excess of 50° C., which still improves the performance of the accumulator.

According to another embodiment of the accumulator of the invention, one associates the hydrogen electrode according to the invention to an electrode of the nickel oxide type, made as those used in the standard Cd-Ni accumulators. One may also use silver oxide electrodes of the type of those used in silver-zinc accumulators.

The accumulators thus made operate with remarkable interesting performances and this particularly advantageously at temperatures which are substantially higher than room temperature. Moreover, they are quickly rechargeable and accept short charging rates. Said accumulators prove therefore to be appropriate for the equipment amongst others of electrical vehicles and electrical power tools.

Further characteristics and advantages of the invention will become apparent from the following description of examples of embodiments, with reference to the accompanying drawings.

Figure 2:
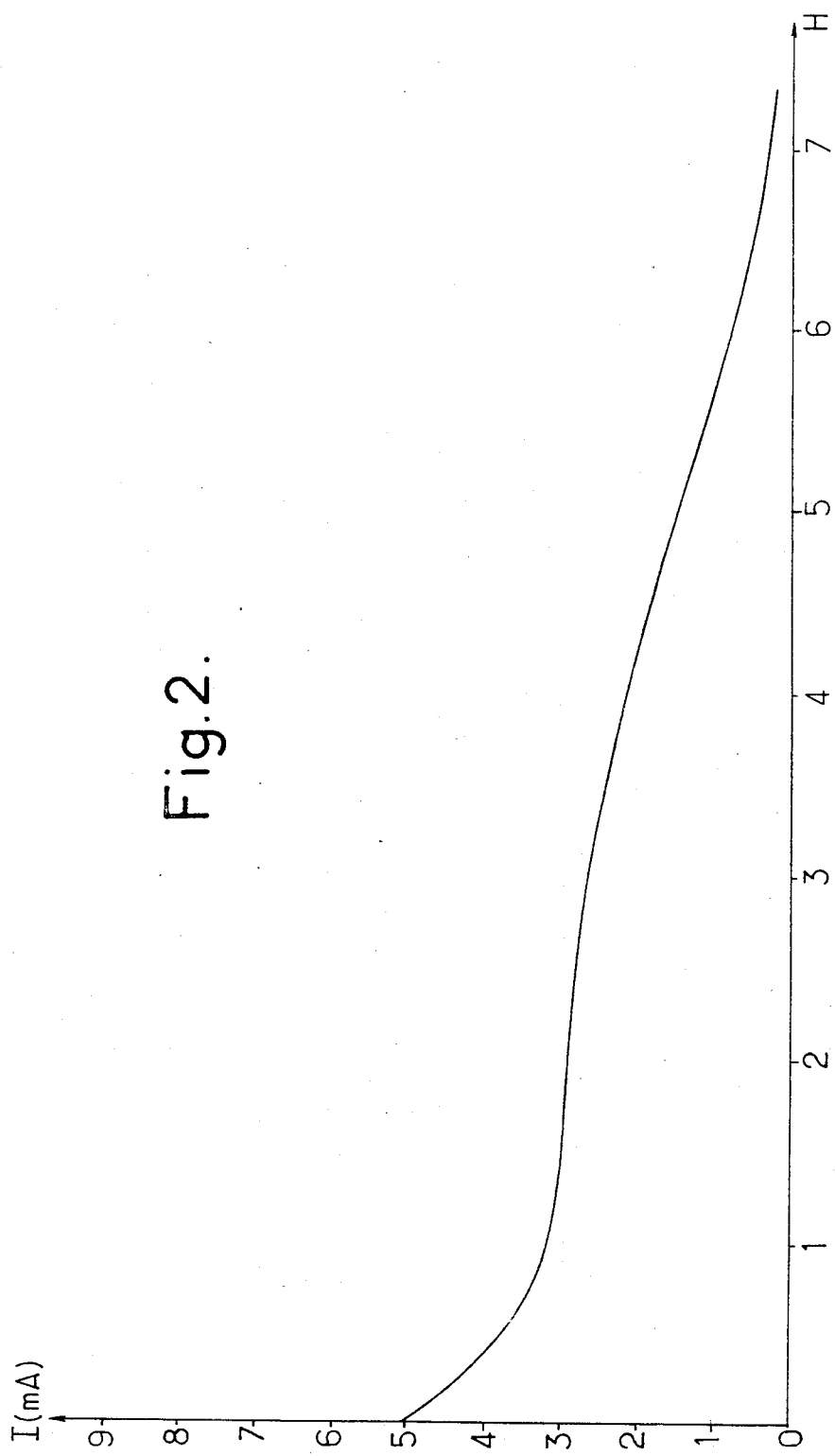
Figure 4:
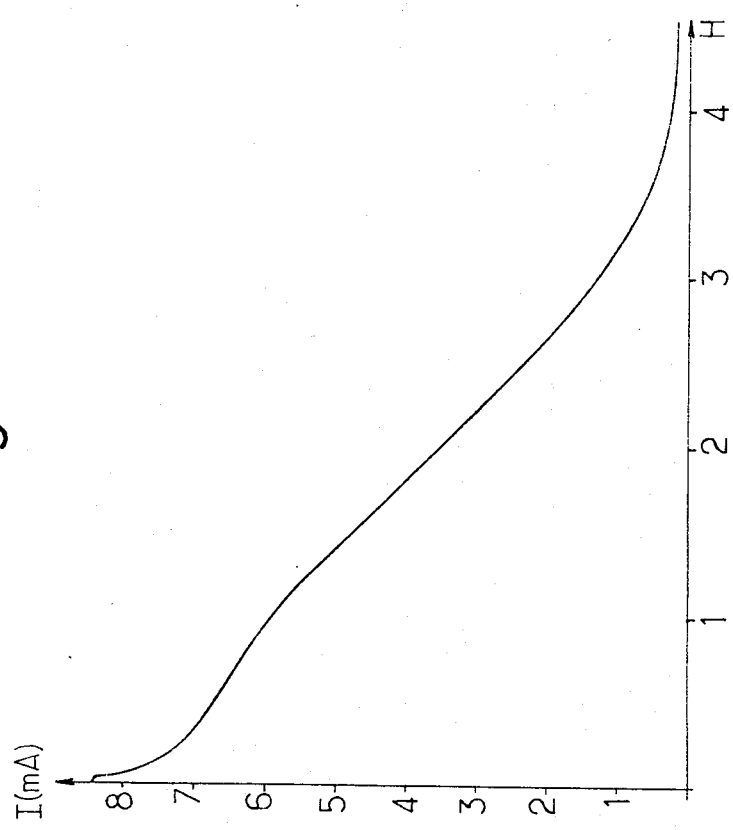
Figure 3:
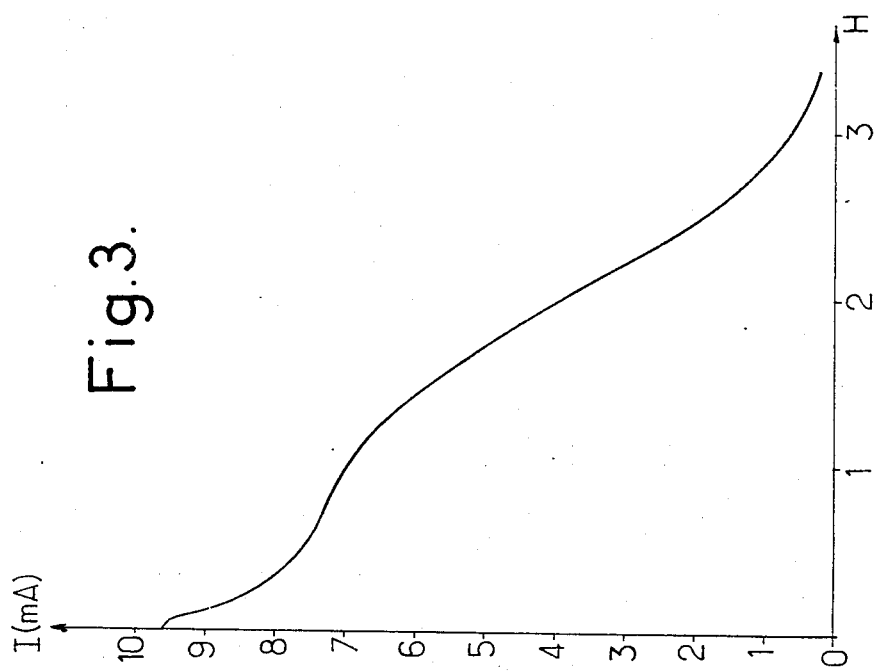

In the drawings, FIG. 1 illustrates the current discharge curve I (in mA) plotted as a function of time H at 21° C. obtained with $La_{1.00}Ni_{4.75}Cr_{0.25}$ alloy, and FIGS. 2, 3 and 4 illustrate the current discharge curves I (in mA) as a function of time respectively at 20°, 40° and 50° C. for $La_{1.00}Ni_{4.25}Mn_{0.25}$ alloy.

EXAMPLE 1

Preparation of the alloy of formula

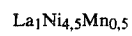

$La_1Ni_{4.5}Mn_{0.5}$

The three constituent elements La, Mn and Ni, used in fragments, are introduced in a copper crucible, cooled down according to the proportions allowing to obtain the desired stoichiometry.

A mixture of said elements is made by melting them and then by heating them through high frequency direct induction up to a temperature of 1550° C. in an argon atmosphere.

Said temperature is maintained for 10 minutes. After cooling of the mixture down to room temperature, the obtained ingot is turned over and a new melting at 1550° C. for 10 minutes is carried out so as to obtain a homogeneous ingot.

In order to complete the homogenisation, one proceeds thereafter to a reheating operation of the ingot at 1150° C. for 3 minutes in an argon atmosphere.

The crystallographic examination of the obtained alloy shows that it has a lattice of the $CaCu_5$ type.

In view of the manufacture of electrodes, said alloys are subjected to several hydrogenations in a solid gas medium. Said treatment increases the reactivity and provides a fine powder (5 to 10$\mu$).

The alloy ingot is coarsely crushed in an argon atmosphere. The fragments of a few millimeters in diameter are introduced in an autoclave. After chasing the air, the hydrogen is admitted at a pressure of the order of 30 bars and the autoclave is heated up to 60° C. The length of time necessary for the maximum adsorption during this first hydrogenation is comprised between a few minutes and half an hour. The device is then again emptied and the hydrogen admitted once more. The hydrogene desorption and adsorption are then very quick. The treatment is carried out three or four times.

By proceeding as hereabove described, the following alloys are prepared:

$La_{1.00}Ni_{4.80}Mn_{0.20}$ $La_{1.00}Ni_{4.25}Mn_{0.75}$ $La_{1.00}Ni_{4.00}Mn_{1.00}$ $La_{1.00}Ni_{4.75}Cr_{0.25}$ $La_{1.00}Ni_{4.50}Cr_{0.50}$ $La_{1.00}Ni_{4.00}Cr_{1.00}$

EXAMPLE 2

Preparation of an alloy of formula:

$La_{1.00}Ni_{4.25}Al_{0.50}Mn_{0.25}$ $La_{1.00}Ni_{4.00}Al_{0.75}Mn_{0.25}$ $La_{1.00}Ni_{4.25}Al_{0.50}Cr_{0.25}$

One proceeds as in Example 1 by mixing the constituent elements in stoichiometr proportions, and melting them at 1150° C. The obtained ingot is subjected to the same treatment as those hereabove described.

EXAMPLE 3

Application of ternary alloys according to Example 1 as hydrogen electrode materials.

One determines from the current discharge curves as a function of time the electrochemical capacities of said alloys.

The results of tests carried out at 20°, 40° and 50° C. are given hereafter by proceeding as follows:

In an aqueous solution of 5N potash, 50 mg of the powdery material are subjected to a slow charging rate, by using a current of 1.5 mA for 16 hours, at a normal temperature (23° C.). The discharge is then studied by imposing to the electrode a potential of −1 V/ECS. The potential taken by the electrode after charging is generally of the order of −1170 mV/ECS. The quantities of stored and then consumed hydrogen are determined by integrating the discharge curve I=f(t), limited to current values of 0.5 mA, that is about 10% of the initial current. They are expressed in mAh.

In the hereabove Table I have been grouped the specific capacities C in mAh/g obtained with the alloys of Example 1 and with LaNi5 as a comparison.

|  | Temperature in °C. | | |
|---|---|---|---|
|  | 20 | 40 | 50 |
| $La_{1.00}Ni_{4.50}Mn_{0.50}$ | 390 | 290 | — |
| $La_{1.00}Ni_{4.25}Mn_{0.75}$ | 370 | 335 | 225 |
| $La_{1.00}Ni_{4.75}Cr_{0.25}$ | 420 | 280 | — |

-continued

|  | Temperature in °C. | | |
|---|---|---|---|
|  | 20 | 40 | 50 |
| $La_{1.00}Ni_5$ | 310 | 25 | ≃0 |

By examining said results, one sees that the high values of the specific capacities of the alloys of the invention show the advantageous effects of the performed substitutions. The specific capacities obtained prove to be substantially superior to that of LaNi5 at room temperature, and they are maintained at high values even at temperatures of 40°–50° C. whereas no brutal diminution of the capacity of LaNi5 is observed during the increase of temperature.

As an illustration, the current discharge curve I (in mA) is plotted in FIG. 1 as a function of time H (in hours) at 21° C., obtained with 48.5 grams of the $La_{1.00}Ni_{4.75}Cr_{0.25}$ alloy in powdery form.

One sees that the curve has a quite conspicuous flat portion over a period of time of about 4 hours with a discharge current intensity slightly superior to 4 mA, which is a performance of great interest.

EXAMPLE 4

Application of quaternary alloys according to Example 2 as hydrogen electrode materials.

The electrochemical capacities of the quaternary alloys of Example 2 are being studied as is mentioned in Example 3.

The herebelow Table 2 shows the results of tests carried out at 20°, 40°, 50° and 60° C. with said alloys and with LaNi5 as a comparison.

|  | Temperature in °C. | | | |
|---|---|---|---|---|
|  | 20 | 40 | 50 | 60 |
| $La_{1.00}Ni_{4.75}Al_{0.50}Mn_{0.25}$ | 325 | 320 | 300 | 160 |
| $La_{1.00}Ni_{4.00}Al_{0.75}Mn_{0.25}$ | 290 | 230 | — | — |
| $La_{1.00}Ni_{4.25}Cr_{0.25}Al_{0.5}$ | 360 | 340 | — | — |

The examination of these results shows an excellent behaviour of the alloys forming the electrode materials of the invention as regards an increase of temperature up to values of the order of 60° C. It is interesting to point out that the substitution by Al increases the electrochemical performance of said materials, more specially at high temperatures.

In FIGS. 2, 3 and 4 have been plotted the current discharge curves I (in mA) as a function of time (in hours) respectively at 20°, 40° and 50° C. for the $La_{1.00}Ni_{4.25}Al_{0.50}Mn_{0.25}$ alloy.

These tests have been carried out in the electrochemical conditions defined hereabove with 49 mg of alloy.

The high values of I over a period of about two and a half hours at 40° C. should be remarked, values which are maintained even when the temperature goes up to 50° C.

We claim:

1. An electrode material suitable for use in forming a hydrogen electrode of an energy accumulator based on lanthanum and nickel, and consisting of an alloy corresponding substantially to the formula LaNi5 in which one of the components La and Ni or both of them are partially substituted by a metal M selected from group VI or VII of the periodic table of elements, in an atomic proportion from 0.1 to 2 with respect to the nickel.

2. An electrode material according to claim 1, wherein the partial substitution relates essentially to nickel.

3. An electrode material according to claim 2, comprising a ternary alloy having the formula $$LaNi_{x-y}M_y$$

wherein M is a metal of the VI or VII group of the periodic table of elements, x is a number from 4.7 to 5.5 and y is a number from 0.1 to b 2.

4. An electrode material according to claim 3, wherein y is a number from 0.5 to 1.

5. An electrode material suitable for use in forming a hydrogen electrode of an energy accumulator based on lanthanum and nickel, and consisting of an alloy corresponding substantially to the formula $LaNi_5$ in which one of the components La and Ni or the both are partially substituted by a metal M of group VII of the periodic table of elements in an atomic proportion from 0.1 to 2 with respect to the nickel, further including at least another element M' partially substituting the lanthanum and/or nickel selected from the groups Ia, II, III, IV and V of the periodic table of elements.

6. An electrode material according to claim 5 corresponding substantially to the formula $$La_aNi_{x-y-b}M_yM'$$

wherein M' is a metal selected from those of groups Ia, II, III, IV and V of the periodic table of elements, x is a number from 4.7 to 5.5, Y is a number from 0.1 to 2, a is a number from 0.8 to 1 and b is a number from 0.1 to 1.

7. An electrode material according to claim 5, wherein the substitution by M' relates essentially to lanthanum, M' being chosen from the IIb, IIIa and IVa groups.

8. An electrode material according to claim 6, wherein the substitution by M' relates essentially to nickel, M' being chosen from the Ia, IIIb and Va groups.

9. An electrode material according to any one of claims 5 to 7, wherein M' represents aluminium.

10. Electrode material according to claim 1, wherein M is manganese.

11. Lanthanum and nickel based ternary alloys selected from the group consisting of $La_{1.00}Ni_{4.50}Mn_{0.50}$, and $La_{1.00}Ni_{4.25}Mn_{0.75}$, alloys.

12. Lanthanum and nickel based quaternary alloys selected from the group consisting of $La_{1.00}Ni_{4.25}Al_{0.50}Mn_{0.25}$, $La_{1.00}Ni_{4.00}Al_{0.75}Mn_{0.25}$ and $La_{1.00}Ni_{4.25}Cr_{0.25}Al_{0.5}$ alloys.

13. Hydrided electrode materials according to claim 1.

14. A hydrogen electrode comprising a material according to claim 1.

15. Hydrogen electrode according to claim 14, characterized in that it comprises a material having on at least a part of its surface compounds which, while authorizing passage of hydrogen during the cathodic charge, slow down the desorption of the adsorbed hydrogen.

16. An electrochemical energy accumulator of the alkaline electrolyte type including a negative electrode based on lanthanum and nickel, said negative electrode comprising an alloy, corresponding substantially to the formula $LaNi_5$ in which one of the components La and Ni or both of them are partially substituted by a metal M selected from group VI or VII of the periodic table of elements, in an atomic proportion from 0.1 to 2 with respect to the nickel.

17. A process for preparing an alloy corresponding substantially to the formula $LaNi_5$ in which one of the components La and Ni or both of them are partially substituted by a metal M selected from group VI or VII of the periodic table of elements, in an atomic proportion from 0.1 to 2 with respect to the nickel which comprises mixing the alloy constitutents in melted state, by using a cooled down crucible for avoiding eventual contamination of the alloy by the crucible constitutents, cooling the mixture of solidify it and subjecting the solidified mixture to a re-heating operation at a temperature between 600° C. and 1300° C.

18. An accumulator according to claim 16 wherein the partial substitution relates essentially to nickel.

19. An accumulator according to claim 16, which includes a ternary alloy having the formula $LaNi_{x-y}M_y$ wherein M is a metal of the VI or VII group of the periodic table of elements, x is a number from 4.7 to 5.5 and y a number from 0.1 to 2.

20. An accumulator according to claim 16, including an alloy corresponding substantially to the formula $LaNi_5$ in which one of the compoennts La and Ni or the both are partially substituted by a metal M of group VII of the periodic table of elements in an atomic proportion form 0.1 to 2 with respect to the nickel further comprising at least another element M' partially substituting the lanthanum and/or nickel selected from the groups Ia, II, III, IV and V of the periodic table.

21. An accumulator according to claim 20 which includes a quaternary alloy having the formula $$La_aNi_{x-y-b}M_yM'_b$$

wherein M' is a metal selected from those of groups Ia, II, III, IV, and V of the periodic table of elements, x is a number from 4.7 to 5.5, y is a number from 0.1 to 2, a is a number from 0.8 to 1 and b is a number from 0.1 to 1.

* * * * *